Patented Aug. 21, 1923.

1,465,448

UNITED STATES PATENT OFFICE.

JOHN F. McCOY, OF NEW ORLEANS, LOUISIANA.

GROUTING COMPOSITION FOR PAVING BLOCKS.

No Drawing.   Application filed December 7, 1920.   Serial No. 428,937.

*To all whom it may concern:*

Be it known that I, JOHN F. McCOY, a citizen of the United States, residing at New Orleans, in the parish of Orleans and State of Louisiana, have invented certain new and useful Improvements in a Grouting Composition for Paving Blocks; and I do hereby declare the following to be a full, clear, and exact description of the invention, such as will enable others skilled in the art to which it appertains to make and use the same.

The prevalent causes of deterioration in block surfaced roads and pavements, besides the breaking loose and bulging of the elements or units, are incident to the susceptibility of the cement or binder to heat, and climatic conditions, resulting in the flowing, running or shifting thereof with the consequent release of the blocks, or are due to the unequal widths of the joints between the units and hence varying thickness or volume of the joint filler at different places, or result from failure of the blocks to adhere to the broken stone or other base or foundation provided for the road surface, and the provision of a grouting composition which will correct these evils falls within the scope of the object of this invention.

The blocks of wood or other preferred material, either treated, as with creosote, pitch or tar, or any equivalent thereof, or untreated as may be found desirable or advisable under some conditions, are supported upon a base or foundation of broken stone or the like, and between the blocks and base there is interposed a cushion binder course partaking of the general characteristics of a grout having cementitious and also cushioning qualities.

To preserve these spacers for the block against corrosion and adapt them to act as keys and reinforcing elements for the joint filler, cementitious or adhesive material arranged in the joints, it is preferred to dip or coat them with a gum solution composed of—

Gum-shellac—one pound, sal-soda—one-half pound, water which should be boiled to insure thorough commingling after which there is preferably added—

Petroleum - residuum—one pint, to serve as a means of resisting the tendency of the magnesite cement (employed in the joint filler, as later explained) to absorb the water of the solution, for which it has a great affinity. Also, as a thinning agency and as a preservative for the gum, an amount of—

Boracid-acid solution—equal to about ten per cent, in volume, of the above composition may be added thereto.

The spacers should be dipped in the above gum solution and then dried before being driven into the blocks.

The cushion binder course which is placed as a grouting upon the base or foundation is composed of a dry mixture of a cement and a filler and a binder.

While various forms of filler material may be used, preferably in a ground or pulverized condition, such as stone, gravel, sand and the like, it has been found particularly advantageous to employ fibrous material like asbestos and more especially wood in the form of saw-dust, graded to increase the density of the resultant composition. This filler material or agent should be lacquered by saturating or coating the same with turpentine and resin (rosin-oil), the material being thoroughly stirred or mixed in the liquid and then drained and dried.

The dry mixture entering into the composition of the grouting to form the cushion binder course comprises—

Lacquered filler 1½ pounds, magnesite (calcined) 1 pound, hydrated lime (dry) 4 ounces. These ingredients should be thoroughly mixed, dry, and then there should be incorporated therewith a binder (solution) composed of—

Gum solution (above) ¼ pint, chloride of magnesium (sol.) 1¼ pints.

This combination of the said dry mixture and the binder may be made before applying to the base or the dry mixture may be applied first and the binder then added, as preferred.

The grouting composed of the dry mixture of filler and cement and the binder is used as the coursing joint filler, except that for convenience in working it may be thinned with chloride of magnesium.

Also, when parallel and transverse expansion joints are used, hydrated lime dust may be introduced to prevent the tar or pitch with which the blocks are treated from affecting the adhesive properties of the cement composition forming a constituent of the grouting.

The combination of gum and granular filler, with the cement not only preserves the adhesive properties of the cement against deterioration or reduction of efficiency by moisture or high temperature, but imparts a quasi-resilient and cushioning effect which results in durability and in the permanence of the anchoring of the blocks to each other and to the base or foundation.

Having thus described the invention, what I claim is:—

1. A grouting for block-surfaced roads having a granular filler of fibrous material and calcined magnesite combined with a binder including a solution of gum.

2. A grouting for block surfaced roads having a granular filler of lacquered fibrous material and calcined magnesite combined with a binder containing a gum solution, the lacquer consisting of a resinous coating.

3. A grouting having a granular filler with calcined magnesite combined with a binder and a gum solution with sal soda.

4. A grouting for block surfaced roads having a granular filler with calcined magnesite combined with a binder including a gum solution, containing petroleum residuum.

5. A grouting for block surfaced roads having a granular filler with calcined magnesite combined with a binder including a gum solution, and a boracic acid diluent and preservative.

In testimony whereof I affix my signature in presence of two witnesses.

JOHN F. McCOY.

Witnesses:
EUGENE COULON,
L. L. DUMAINE.